US008506003B2

(12) United States Patent
Smith et al.

(10) Patent No.: US 8,506,003 B2
(45) Date of Patent: Aug. 13, 2013

(54) VEHICLE COMPONENT AND METHOD FOR MAKING A VEHICLE COMPONENT

(75) Inventors: Nels R. Smith, Holland, MI (US); Scott A. Hansen, Holland, MI (US); Jeffrey T. Stout, Grand Rapids, MI (US); Andy Butz, Zeeland, MI (US); Bart W. Fox, Zeeland, MI (US)

(73) Assignee: Johnson Controls Technology Company, Holland, MI (US)

( * ) Notice: Subject to any disclaimer, the term of this patent is extended or adjusted under 35 U.S.C. 154(b) by 1196 days.

(21) Appl. No.: 10/585,037

(22) PCT Filed: Jan. 3, 2005

(86) PCT No.: PCT/US2005/000038

§ 371 (c)(1), (2), (4) Date: Jun. 25, 2009

(87) PCT Pub. No.: WO2005/068152

PCT Pub. Date: Jul. 28, 2005

(65) Prior Publication Data

US 2009/0295011 A1 Dec. 3, 2009

Related U.S. Application Data

(60) Provisional application No. 60/534,321, filed on Jan. 3, 2004.

(51) Int. Cl.
*B60R 13/02* (2006.01)

(52) U.S. Cl.
USPC ....... 296/146.7

(58) Field of Classification Search
USPC ....... 296/146.7, 39.1, 1.08, 1.09
See application file for complete search history.

(56) References Cited

U.S. PATENT DOCUMENTS

| | | | | |
|---|---|---|---|---|
| 4,861,543 | A * | 8/1989 | Rafferty | 264/545 |
| 5,297,842 | A * | 3/1994 | Hayashi | 296/146.7 |
| 5,304,273 | A * | 4/1994 | Kenrick et al. | 156/219 |
| 5,372,491 | A | 12/1994 | Fritsch et al. | |
| 5,624,523 | A * | 4/1997 | Stiller | 156/285 |

(Continued)

FOREIGN PATENT DOCUMENTS

| | | |
|---|---|---|
| JP | 09-076256 | 3/1997 |
| JP | 10-076544 | 3/1998 |

(Continued)

OTHER PUBLICATIONS

International Search Report for PCT/US2005/000038, date of mailing Sep. 23, 2005, 3 pages.

*Primary Examiner* — H Gutman

(74) *Attorney, Agent, or Firm* — Foley & Lardner LLP

(57) ABSTRACT

The invention is also directed to a method for forming a component for a vehicle. The method comprises forming a substrate in a mold by injecting a first resin into a first cavity, reconfiguring a portion of the mold to form a second cavity, and injecting a second resin into a second cavity; providing a flexible member adjacent at least a portion of the substrate to form a cavity between the substrate and the flexible member; coupling at least a portion of the flexible member to the substrate; and introducing a material into the cavity after securing at least a portion of the flexible member to the substrate. The flexible member and the material introduced into the cavity form a cushioned region for the vehicle component

20 Claims, 14 Drawing Sheets

(56) References Cited

U.S. PATENT DOCUMENTS

| | | | | |
|---|---|---|---|---|
| 5,932,331 | A * | 8/1999 | Jones et al. | 428/218 |
| 6,093,272 | A * | 7/2000 | Visconti et al. | 156/219 |
| 6,214,157 | B1 * | 4/2001 | Spengler | 156/304.6 |
| 6,708,462 | B2 * | 3/2004 | Pokorzynski et al. | 52/716.5 |
| 7,332,207 | B2 * | 2/2008 | Bondar et al. | 428/71 |
| 7,806,450 | B2 * | 10/2010 | Johnson et al. | 296/1.08 |
| 7,879,424 | B2 * | 2/2011 | Smith et al. | 428/71 |
| 2002/0125734 | A1 | 9/2002 | Pokorzynski et al. | |
| 2003/0012837 | A1 | 1/2003 | Siano | |
| 2004/0130051 | A1 * | 7/2004 | Cowelchok et al. | 264/46.4 |
| 2007/0029829 | A1 * | 2/2007 | Johnson et al. | 296/1.08 |
| 2008/0157432 | A1 * | 7/2008 | Boyer | 264/257 |
| 2009/0127738 | A1 * | 5/2009 | Smith et al. | 264/254 |
| 2009/0295011 | A1 * | 12/2009 | Smith et al. | 264/101 |
| 2010/0279051 | A1 * | 11/2010 | Pokorzynski et al. | 428/43 |
| 2011/0139338 | A1 * | 6/2011 | Fox | 156/70 |

FOREIGN PATENT DOCUMENTS

| | | | |
|---|---|---|---|
| JP | 10-203287 | | 8/1998 |
| JP | 10-250519 | | 9/1998 |
| JP | 2000-210978 | | 8/2000 |
| JP | 2005007818 | A * | 1/2005 |
| WO | WO 2005039857 | A1 * | 5/2005 |
| WO | WO 2005068152 | A2 * | 7/2005 |

* cited by examiner 18
150
122
20
140
120
112
114
20

18
20
122
140

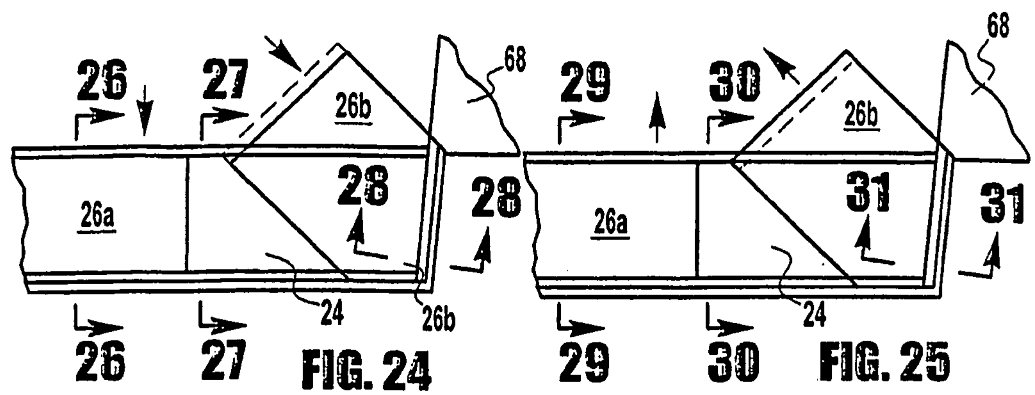
FIG. 24
FIG. 25
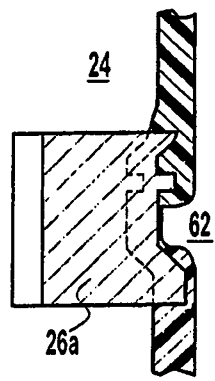
FIG. 26
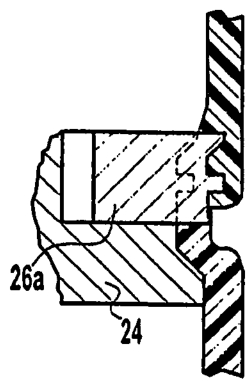
FIG. 27
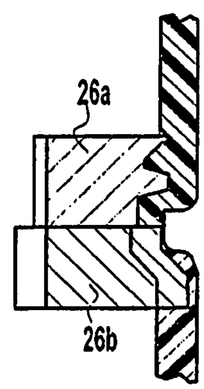
FIG. 28
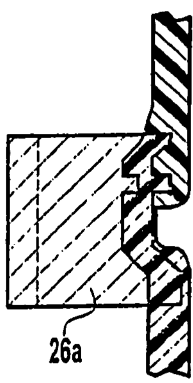
FIG. 29
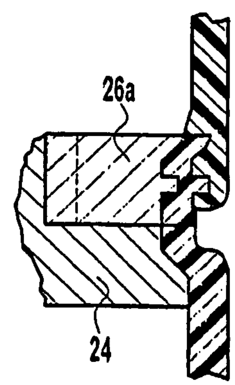
FIG. 30
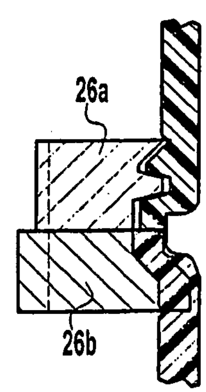
FIG. 31

VEHICLE COMPONENT AND METHOD FOR MAKING A VEHICLE COMPONENT

CROSS-REFERENCE TO RELATED PATENT APPLICATIONS

The present application is a national stage of International Application PCT/US2005/000038 filed on Jan. 3, 2005, which claims priority to U.S. Provisional Patent Application No. 60/534,321, filed on Jan. 3, 2004, the full disclosures of which are hereby incorporated herein by reference in their entirety.

BACKGROUND OF THE INVENTION

The present application relates to the field of molded articles having multiple colors and/or made from multiple materials and integrated soft portions. More specifically, the present inventions further relate to interior panels or structures for vehicles (e.g., automobiles such as cars, trucks, and the like; airplanes, boats, etc.) or other applications that include at least one relatively soft (e.g., padded or cushioned) portion formed by a foamed-in-place (PFIP) process.

It is generally known to provide for a vehicle trim panel comprised of multiple colors or multiple materials by connecting multiple pieces. Such known trim panels are typically joined together into one assembly by conventional methods such as ultrasonically welding, heat staking or mechanical fastening. Another way of producing a multi-colored trim panel is to mask specific regions and paint the desired color. However, such multi-piece trim panels have several disadvantages including poor fit and finish due to part and assembly variation. Accordingly, it would be advantageous to provide a molded article that is molded with multiple colors, materials, textures, and the like. It would also be advantageous to provide a vehicle trim component (e.g., door panel, pillar, instrument panel, console, etc.) with multiple colors and/or multiple materials that does not need secondary joining operations and is not masked and painted.

It is also generally known to provide padded or cushioned vehicle interior components. Padded or cushioned vehicle interior components such as panels (e.g., instrument panels, door panels, etc.) conventionally include a substrate made of a relatively rigid material, a relatively soft core (e.g., a foam core), and an outer surface or skin. For example, a vehicle door panel may be cushioned to provide added comfort for an occupant of a vehicle when a portion of the occupant's body interfaces or contacts the door panel. Various methods of providing such cushioning are known in the art, although such known methods do not provide certain advantageous features and/or combination of features. For example, one difficulty in producing panels having cushioned portions is that it may be difficult to optimize the location of the cushioned portions such that the cushioned portions are provided only in areas that are directly interfaced (e.g., contacted) by an individual. Alternatively, certain areas of vehicle interior trim panels are not contacted by passengers such as locations on a door panel proximate the floor of the vehicle. There may be little or no reason to provide cushioned portions of the door panel in such regions. Further, providing cushioned portions or regions in areas where there is no requirement to do so adds unnecessary expense (i.e., material, labor, and equipment) and may also add excess weight to the vehicle.

To provide localized cushioned portions for interior vehicle components, one known method involves coupling a cushioned component to a rigid component. For example, a relatively rigid panel (e.g., a door panel) may have coupled thereto a component that includes a relatively rigid substrate, a relatively soft skin, and a foam interior portion. One difficulty with such a method is that such method requires the use of additional components (e.g., an additional substrate, bolts or other fastening devices to secure the panel substrate to the substrate of the cushioned portion, etc.), which adds both weight and expense to the finished product.

Accordingly, it would be advantageous to provide a method for producing components such as panels or other structures for use in vehicles that includes a relatively soft or padded portion or section. It would also be advantageous to provide components that have regions of localized cushioning that are optimized based on the location likely to be interfaced by a vehicle occupant or other individual. It would be further advantageous to provide a component that has regions of localized cushioning that has a decreased mass and requires less material than conventional components having cushioned regions. It would further be advantageous to provide components and a method for making components that may be manufactured in a relatively simple and efficient manner with reduced manufacturing and material costs, and utilizes existing equipment.

To provide an inexpensive, reliable, and widely adaptable trim panel that avoids the above-referenced and other problems would represent a significant advance in the art.

SUMMARY OF THE INVENTION

One embodiment of the invention relates to a molded article formed by a multi injection substrate, a skin, and foam injected between the substrate and skin. The process for forming the substrate comprises injecting a first material into a first cavity, moving a retractor member to define a second cavity, and injecting a second material into the second cavity. The first and second materials may be different types of plastic, different colors, textures, or combinations thereof. The first cavity is defined by two mold sections (e.g., a cavity and a core) and the retractor member. The second cavity is also defined by the two mold sections, the retractor member, and the (at least partially) hardened first material. The molded article may be a door trim panel or vehicle instrument panel, or the like. The skin and substrate are placed in a fixture and the foam is injected between the skin and substrate.

The invention is also directed to a method for forming a component for a vehicle. The method comprises forming a substrate in a mold by injecting a first resin into a first cavity, reconfiguring a portion of the mold to form a second cavity, and injecting a second resin into a second cavity; providing a flexible member adjacent at least a portion of the substrate to form a cavity between the substrate and the flexible member; coupling at least a portion of the flexible member to the substrate; and introducing a material into the cavity after securing at least a portion of the flexible member to the substrate. The flexible member and the material introduced into the cavity form a cushioned region for the vehicle component. The flexible member may be provided in a region of the interior panel intended to be contacted by an occupant of the vehicle (e.g., a door panel). The method may also comprise forming the flexible member utilizing at least one of a slash molding process, a vacuum forming process, an injection molding process, an extrusion process, and a casting process. The flexible member may be formed of a material selected from the group consisting of textiles, polyurethane, polyvinylchloride, a thermoplastic olefin, and combinations thereof. The step of introducing the material into the cavity may comprises introducing the material into the cavity (e.g., through an aperture formed in the substrate) and expanding the material (e.g., a foam material). The flexible member may includes a first feature configured for coupling with a second feature provided on the substrate, and wherein the step of coupling the skin to the substrate comprises coupling the first feature to the second feature. The step of coupling the flexible member to the substrate comprises securing the flexible member to the substrate with a vacuum. The substrate may include at least one aperture so that air within the cavity is drawn through the aperture by the vacuum device. The aperture may be provided in the substrate at the location where the first feature is coupled to the second feature and/or at a location intermediate the location of a boundary formed between the flexible member and the substrate and the location where the first feature is coupled to the second feature. As such, the location where the first feature is coupled to the second feature may be provided intermediate the location of a boundary formed between the flexible member and the substrate and the location of the aperture. The step of forming a substrate may comprise providing a first mold section, a second mold section, and a shut-off member movable between a first position and a second position; providing a first cavity defined by the first mold section, the second mold section, and the shut-off member when in the first position; and providing a second cavity is defined by the first mold section, the second mold section, the first resin, and the shut off member when in the second position.

The invention is further directed to a trim panel for use in a vehicle. The trim panel comprises a one-piece molded member having a first substrate portion made of a first resin, a second substrate portion made of a second resin, and a cushioned layer at least partially covering one of the first substrate portion and the second substrate portion. The one-piece molded member is formed by a process wherein the cushioned layer is positioned into at least one of a first cavity and a second cavity, the first resin is injected into the first cavity, a retractor member is moved to define a second cavity, and the second resin is injected into the second cavity.

Other embodiments further relates to various features and combinations of features shown and described in the disclosed embodiments.

BRIEF DESCRIPTION OF THE DRAWINGS

FIG. 24 is a schematic side section view of a mold with a slide member in a extended position.

FIG. 25 is a schematic side section view of the mold of FIG. 24 with the slide member in a retracted position.

FIG. 26 is a section view of the mold with the extended slide member of FIG. 15 taken along line 26-26.

FIG. 27 is a section view of the mold with the retracted slide member of FIG. 18 taken along line 27-27.

FIG. 28 is a section view of the mold with the extended slide member of FIG. 18 taken along line 28-28.

FIG. 29 is a section view of the mold with the retracted slide member of FIG. 19 taken along line 29-29.

FIG. 30 is a section view of the mold with the extended slide member of FIG. 19 taken along line 30-30.

FIG. 31 is a section view of the mold with the retracted slide member of FIG. 19 taken along line 31-31.

DETAILED DESCRIPTION OF THE PREFERRED EMBODIMENTS

Figure 1:
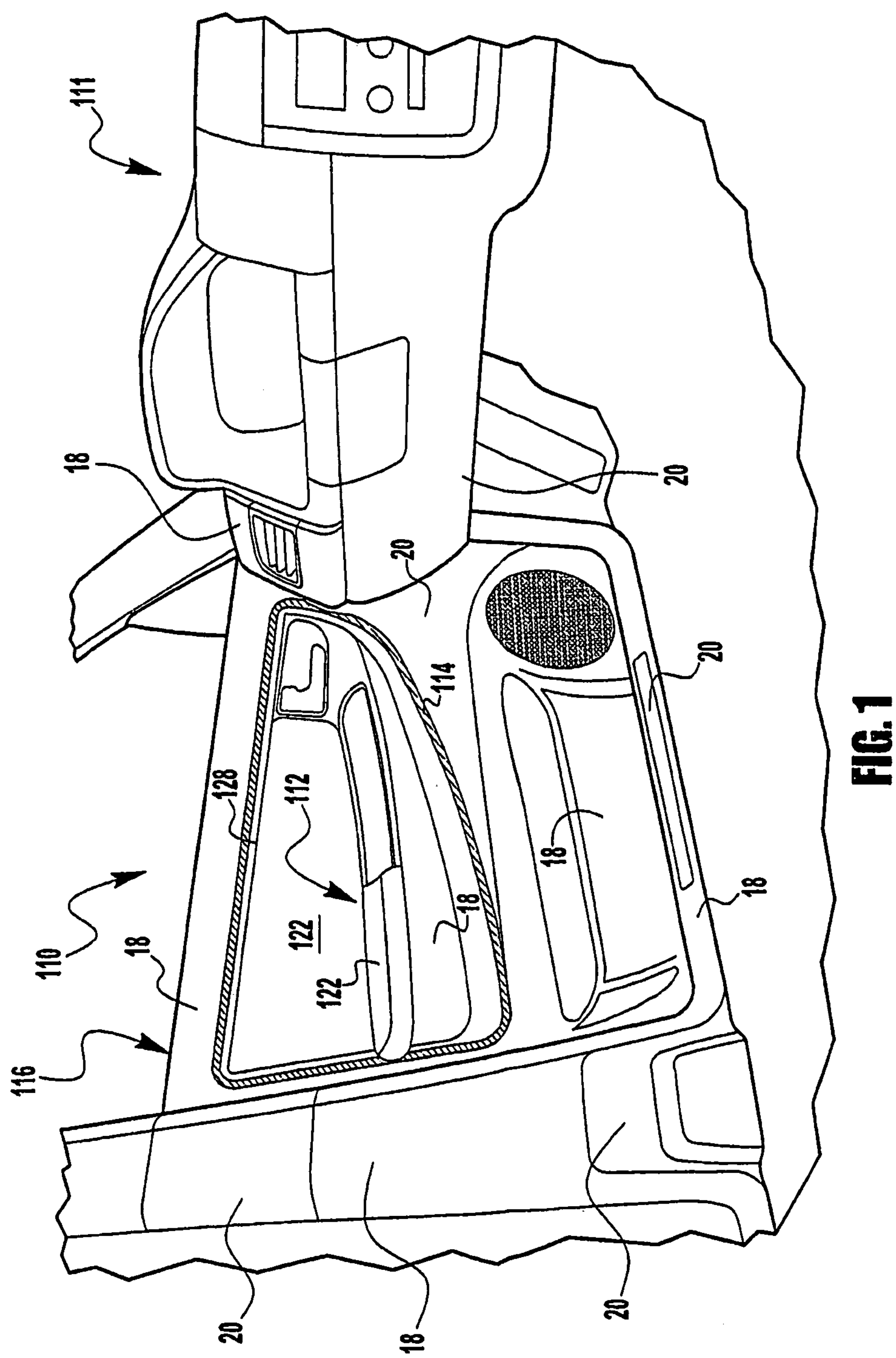
FIG. 1 is a perspective view of a vehicle interior including a door panel and an instrument panel.
Figure 2:
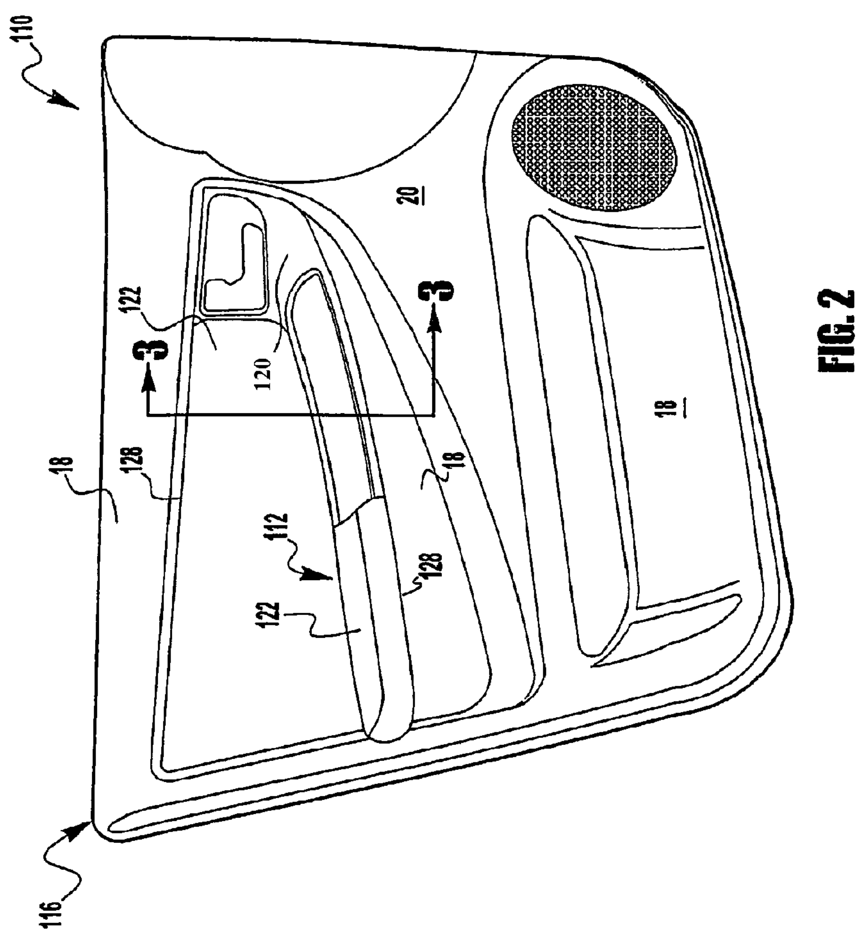
FIG. 2 is a perspective view of a door panel according to a preferred embodiment.

Before proceeding to the description of a number of exemplary embodiments of the invention in detail, it is to be understood that the invention is not limited to the details or methodology set forth in the following description or illustrated in the drawings. The invention is capable of other embodiments or being practiced or carried out in various ways. It is also to be understood that the phraseology and terminology employed herein is for purpose of description and should not be regarded as limiting.

In general, the component or molded article described in this disclosure is a molded article having one or more localized or discrete areas or portions of softness or cushioning. In one embodiment, the molded article is configured as a trim panel for use in a vehicle (e.g., automobiles such as cars, trucks, buses, and the like; airplanes, boats, etc.). Providing a trim panel with one or more localized or discrete areas or portions of softness or cushioning enables the trim panel to selectively include areas of softness in areas that are likely to be interfaced by a passenger or other individual without the need to provide cushioning to the entire trim panel. In this manner, the areas of cushioning may be optimized based on the typical passenger experience. One advantageous feature of such a trim panel is that materials and manufacturing costs may be reduced, and the relatively inefficient practice of providing cushioning in areas that are not generally contacted by a passenger may be eliminated.

The molded article described in this disclosure may be employed in a variety of applications, and is generally applicable with any application wherein it would be beneficial to provide a molded article having one or more localized or discrete areas or portions of softness or cushioning. As mentioned above, in one embodiment, the molded article is a trim panel for use in a vehicle. Such trim panels are particularly suitable for use in an interior passenger compartment of a vehicle, and may find utility in the form of door panels, dashboards, instrument panels, consoles, sidewall trim, overhead liners, or other vehicle components or portions thereof. While the disclosed embodiments may be described as a vehicle trim panel, such as a door panel, the features of the disclosed embodiments are equally applicable with other applications such as other panels, molded articles and components and other office, home, or educational, industrial, commercial, or consumer products which employ localized areas or regions of softness.

Proceeding now to descriptions of the preferred and exemplary embodiments, FIG. 1 is a perspective view of a vehicle interior having a trim panel coupled to a door panel 110 and an instrument panel 111. Door panel 110 includes a member or element in the form of a relatively rigid substrate, base, or stratum (referred to herein as a "substrate" 120), and localized or discrete areas of softness or cushioning in areas or portions (shown as a relatively "padded" or "compressible" or cushioned layer or region 112) that are likely to be interfaced or contacted by a passenger or other individual. For example, door panel 110 includes cushioned regions 112 where a portion of the body of a passenger is likely to contact the door panel (e.g., on an armrest 114, adjacent a window sill 116, etc.) without the need to provide cushioning in the entire door panel. Such a configuration enables areas that are not typically contacted by a passenger, shown as one or more portions 18, to be made of a relatively hard plastic or other material. For descriptions purposes, only door panel 110 will be referred to, but it is understood by a person having ordinary skill in the art that the description also applies to other trim panels such as instrument panels and the like.

The methods of providing localized areas or regions of softness or cushioning in a manner described herein may be utilized to provide molded articles having a wide variety of configurations. For example, door panel 110 may be provided with one or more portions 18 (e.g., areas, regions, islands, etc.) of hard plastic (e.g., bezels, accents, appliques, pull cups, etc.). In another example, door panel 110 may be formed with complex geometries (e.g., ball armrests, x, y, z boundaries, etc.). In yet another example, door panel 110 may include proud (e.g., raised) or recessed regions of cushioning for enhanced aesthetics.

Referring to FIGS. 5-11, 12, 15-17, and 24-31, which illustrate preferred, exemplary, and alternative configurations and methods of molding the substrate, the substrate may be formed by a process that allows for multiple materials to be allocated at different portions of the substrate. According to an exemplary embodiment, the process for making such a substrate includes multiple injections into a mold that is reconfigured during the molding operation. It is important to note that the terms "multi-color," "multi-material," "multiple colors," "multi-shot, " and "different" polymers (or "plastics," "polymeric materials," "polymeric resins" and the like) as used herein are intended to be broad terms and not terms of limitation. The particular materials used to construct the exemplary embodiments are also illustrative. The resins may be different colors of the same polymer, different polymers that have the same color, different polymers that have different colors, and the like. Any of a variety of materials can be used, including polymers such as thermoplastics, thermosets, elastomers, and the like. For example, any variety of thermoplastic resins such as polypropylene, polyethylene, high density polyethylene, acrylonitrile butadiene styrene ("ABS"), polycarbonate, vinyl, polyester, polyurethane, thermoplastic elastomer (TPE), thermoplastic elastomer polyolefin (TPO), thermoplastic vulcanizate (TPV), polyvinyl chloride (PVC), nylon, any of a variety of homopolymer plastics, copolymer plastics, plastics with special additives, filled plastics, or the like may be used. Also, any of a variety of thermoset resin such as phenolics, thermosetting polyester, silicone, polyurethane elastomers, or the like may be used. Further, any of a variety of elastomer resins such as rubber, butyl, synthetic elastomer (SBR), or the like may be used. There may be one, two, three, or more polymers that are co-molded or sequentially molded. The molding operation is preferably injection molding, but any of a variety of molding operations may be used such as reaction injection molding (RIM), transfer molding or the like. Also, descriptions or claims that identify or recite a "first resin" and a "second resin," a "first polymeric material" and a "second polymeric material," or a "first color" and a "second color" are intended to be broad terms and not limited to one, two, etc. resins, materials, or colors (i.e., cover articles that have three, four, etc. resins, materials, and colors, or combinations thereof). The material used for the substrate can also be translucent in nature, allowing for LED or conventional lamps (or any of a variety of light sources) to be located or attached to the rear of the panel to backlight the exposed rim of material (e.g., border). In addition, this process eliminates assembly of various components that can lead to unsightly gaps, buzz squeak and rattle, and other craftsmanship issues.

According to an exemplary embodiment, cushioned region 112 generally includes an outer layer (shown as a cover or skin 122) and a compressible or filler material (see, e.g., filler material 140 shown in FIGS. 3 and 4) provided intermediate or between skin 122 and substrate 120. FIGS. 5-11, 12, 15-17, and 24-31 illustrate preferred, exemplary, and alternative configurations and methods of molding the substrate. FIGS. 3, 4, and 18-21 illustrate preferred, exemplary, and alternative configurations and methods of coupling the skin to the substrate and introducing the compressible material between the skin and the substrate. According to an exemplary embodiment shown in FIGS. 3 and 4, cushioned region 112 is provided above or over at least a portion of substrate 120 Skin 122 forms at least a portion of an exterior surface of the trim panel (e.g., the portion visible from a passenger compartment, which is typically be referred to as the "A" surface, etc.) of the trim panel. According to an exemplary embodiment, a portion of substrate 120 may also form a portion of the exterior surface of the trim panel. A boundary 150 between substrate 120 and the skin 122 may be provided (e.g., in the form of an interface, seam, or joint). Boundary 150 may be visible at the exterior surface of the trim panel or may be filled in with a material to provide a "seamless" look for the trim panel.

Exemplary methods for molding the substrate are shown in FIGS. 11, 12, 15-17, and 24-31 and are described below, but generally uses a multi-shot molding technique (e.g., injection molding, spin molding, transfer molding, over molding, or the like) to produce a one-piece, multi-color/multi-material trim panel There are many styling opportunities that can be realized with a multi-resin substrate (i.e., a substrate formed by a process involving multiple injections of plastic into a mold) when compared to a conventional multiple-piece substrate fastened together. For example, a two-color color boundary may run (e.g., transition, pass, etc.) through an opening or another component. Isolated color break-ups that make a feature look separate may be realized in the one-piece trim panel such as a different color molded-in speaker grille or map pocket border. Multi-color pillar trim may be provided to allow flow-through from the interior's front to rear without having to break the trim into multiple pieces. Accents in scuff plates and other trim may be produced in the same piece. Part separation does not have to dictate color break-up location. Specific details and features can be highlighted in a different color. In contrast, traditional methods of trim panel manufacture would require multiple tools to create the separate hard colors for the substrate and a separate tool to create the bolster with the laminate. Once these pieces are created, there would be an assembly process for joining of the three separate substrates requiring additional capitol, labor, and manufacturing footprint. The disclosed method for molding the substrate combines all of these into one injection molded tool.

Figure 5:
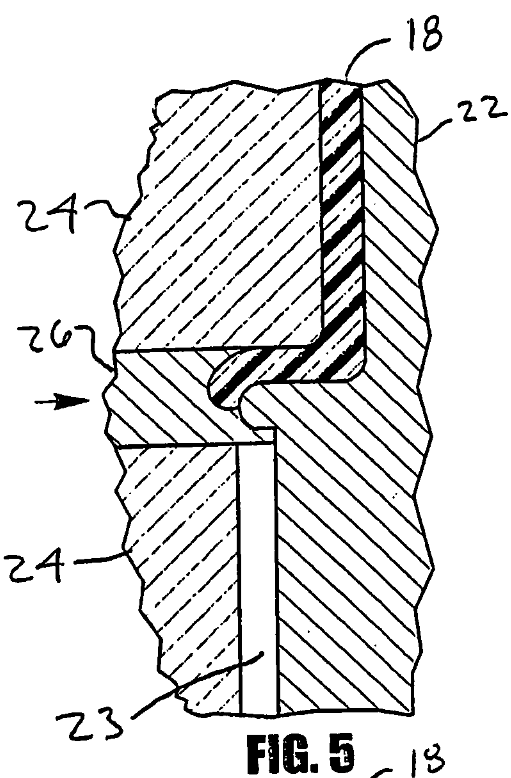
FIG. 5 is a side section view of a mold for molding a substrate with a slide member in an extended position and resin injected into a first cavity.

FIG. 5 shows a fragmentary sectional view of a mold during a molding operation for a trim panel. According to an exemplary embodiment, the mold includes a first mold section or cavity 22, a second mold section or core 24, and a slide shut-off member or retractor 26. Preferably, the retractor 26 is at least partially disposed in the core 24. Preferably, the "A" surface (or "show surface") of the molded article is provided by the cavity 22 and the "B" surface is provided by core 24. According to alternative embodiments, the retractor is disposed in the cavity and/or the "A" surface is provided by the core. In an exemplary embodiment, the "A" surface (as provided by the substrate as the skin) may be imprinted, molded-in, or stamped with any of a variety of indicia or patterns (e.g., wood grain, etc.).

Figure 6:
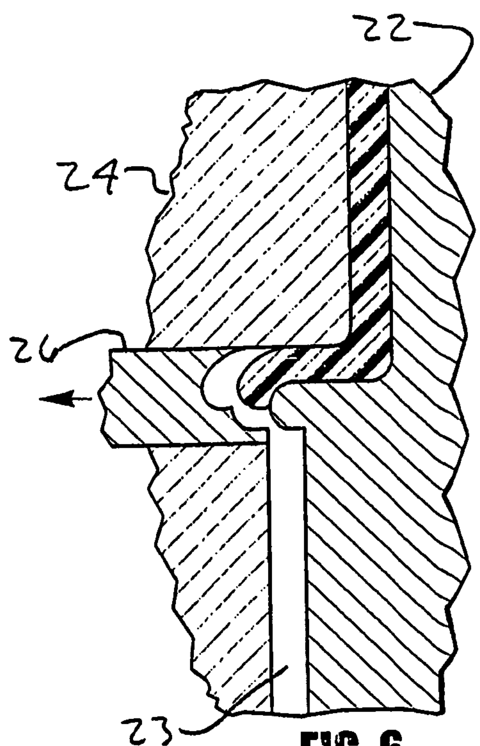
FIG. 6 is a side section view of the mold of FIG. 3 with the slide member in a retracted position to define a second cavity.
Figure 7:
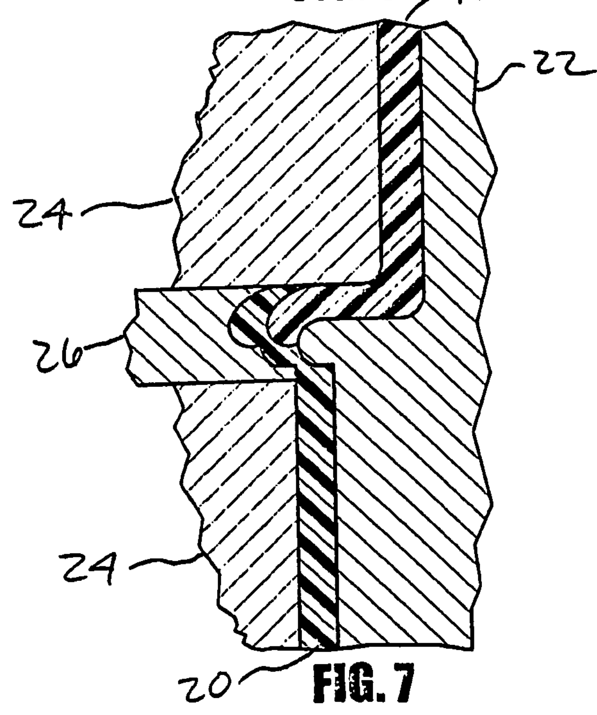
FIG. 7 is a schematic side section view of the mold of FIG. 3 with the slide member in a retracted position and resin injected into the second cavity.
Figure 8:
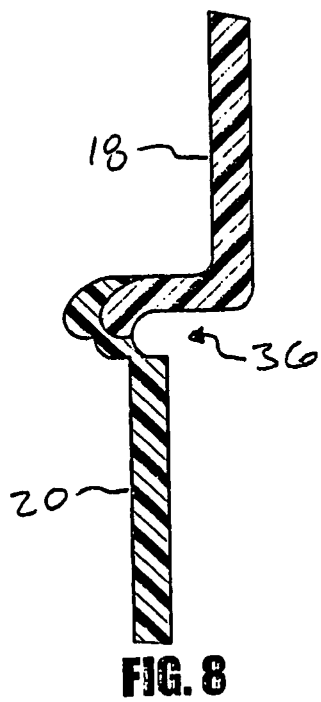
FIG. 8 is a schematic side section view of the substrate molded from two resins in FIGS. 5-7.

The first "shot" of polymeric resin material (representative of a first portion 18 of trim panel 110 or 111) is constrained within the mold corresponding to a particular region on the trim panel by a first cavity defined by the retractor 26, core 24, and cavity 22. Referring to FIG. 6, once the first cavity is filled with polymeric resin, the retractor 26 is displaced (preferably by approximately the thickness of the part) to provide a second cavity 23 defined by the displaced retractor 26, cavity 22, core 24, and the first polymeric resin. Referring to FIG. 7, the second "shot" (representative of a second portion 20 of trim panel 110 or 111) then fills the second cavity with polymeric resin that flows to and bonds with the first material boundary. According to an exemplary embodiment, the second shot is provided by a secondary injection unit.

Preferably, the retractor 26 provides the shut-off for the polymeric resin by not contacting the mold such that there is a space or gap between the retractor and the opposing mold section, which is intended to provide a vent to allow air to escape from the first cavity as the resin fills the first cavity. As such, the retractor is not required to actually contact the cavity surface in the first position to stop the flow of material into the second cavity. Instead, depending on the viscosity of the molten resin, the retractor may be offset from (e.g., not in contact with) the second mold section (i.e., the core). As such, the retractor may either shut off against the core or be offset relative to the core. According to a preferred embodiment, the first material is at least partially solidified when the second material is injected. The mold shown in FIG. 5 includes a vent 27 between the retractor 26 and the cavity 22. Vent 27 is provided by retractor 26 not shutting off against cavity 22 (i.e., so that the gap or space exists) so that air from the first cavity can escape through vent 27 as the first polymeric resin as injected into the first cavity. According to an alternative embodiment, the retractor may be designed to "shut-off" against the cavity by contacting the mold (i.e., no vent). According to yet another alternative embodiment, the lower portion 20 of the molded article (instrument panel) may be molded first (e.g., by rotating the retractor around, for the geometry shown).

The first shot of polymeric resin may be injected when the mold is closed, or when the mold is partially open. The amount of gap left in the partially closed mold will depend on a variety of factors, including the geometry of the part, and the like. Referring to FIG. 5, for the first shot 30, the retractor 26 closes-off on the cavity-half of the mold to prevent the first shot from entering into upper portion of tool (shown as the second cavity). The first shot is injected into the first cavity.

The retractor that forms part of the shut-off can be perpendicular to or at an angle relative to the direction of the die (mold, tool, etc.) draw. According to an exemplary embodiment (shown in FIGS. 5-7), the perpendicular retractor surface is configured to provide a "square" recess (e.g., ditch, indent, etc.) at the two-shot boundary. According to another exemplary embodiment (shown in FIGS. 9 and 10), an angled shut-off 28 (shown as a surface of a retractor 26) is configured to provide an angled recess 36 that is intended to allow the two-shot boundary to be hidden from the occupant's sight for most in-car positions. This angled shut-off 28 creates an apparent geometric gap or transition that may be more desired (for some molded articles) than a square, mechanical recess because it can hide the material joint. Such a configuration may be used to hide the interface between skin 122 and substrate 120, and/or hide the interface between the two-shot boundary. The shut-off surface on the retractor (either perpendicular to or at an angle to die draw) is designed to withstand molding pressures and prevent injected plastic from flowing into other areas of the tool.

Figure 9:
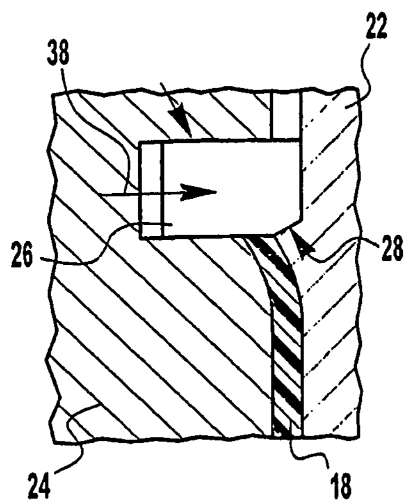
FIG. 9 is a side section view of a mold according to an exemplary embodiment with a slide member in the extended position and a first shot of polymer material injected into a first cavity.
Figure 10:
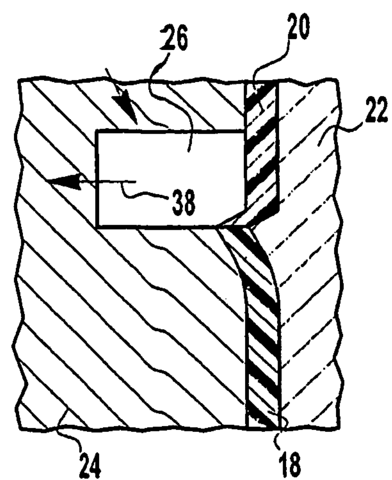
FIG. 10 is a schematic side section view of the mold of FIG. 9 with a slide member in the retracted position and a second shot of polymer material injected into a second cavity.
Figure 11:
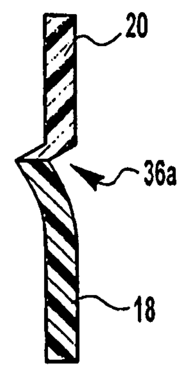
FIG. 11 is a side section view of a plastic article molded as shown in FIGS. 9 and 10.

Referring to FIG. 9, for the second shot of resin that forms second portion 20, the retractor 26 is pulled back to open the upper portion of the tool and provide the second cavity. Preferably, the retractor 26 moves approximately a wall-stock thickness. The second shot is injected and stops flowing when it reaches the first material. FIG. 10 illustrates the finished part. FIGS. 6, 7, 9, and 10 illustrate movement of a retractor 26 to provide for the first cavity and then the second cavity during the molding operation. According to an exemplary embodiment, the retractor 26 is configured to move between a first position and a second position (shown in broken lines) during the molding operation. (According to alternative embodiments, the retractor is configured to move to three or more positions (e.g., a third position, etc.) during the molding operation.) The slide or retractor 26 may be moved using any number of methods, including hydraulics, pneumatics, mechanically, or the like.

The shut-off geometry allows the intersection or interface of the two materials (injections or "shots") to be hidden from view. According to an exemplary embodiment, the shut-off geometry provides for a recess 36*a* that has outer surfaces that are angled relative to the major surface of the molded part. According to a preferred embodiment, the recess 36*a* is angled so that interface of the two materials is hidden (e.g., at least partially, substantially, etc.) from the line of site of the vehicle occupants. According to an exemplary embodiment, the angled recess geometry is provided by an angled shut-off surface. Referring to FIG. 10, an arrow 38 illustrates the direction of the draw of the retractor and the mold die.

Figure 13:
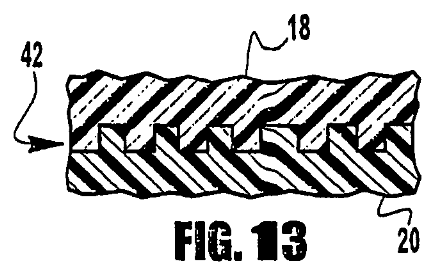
FIG. 13 is a section view of an interlocking interface of a first molded portion and a second molded portion of FIG. 12 taken along line 13-13.
Figure 14:
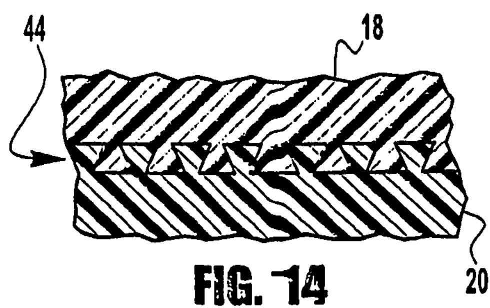
FIG. 14 is a section view of an interlocking interface of FIG. 12 according to an alternative embodiment.
Figure 12:
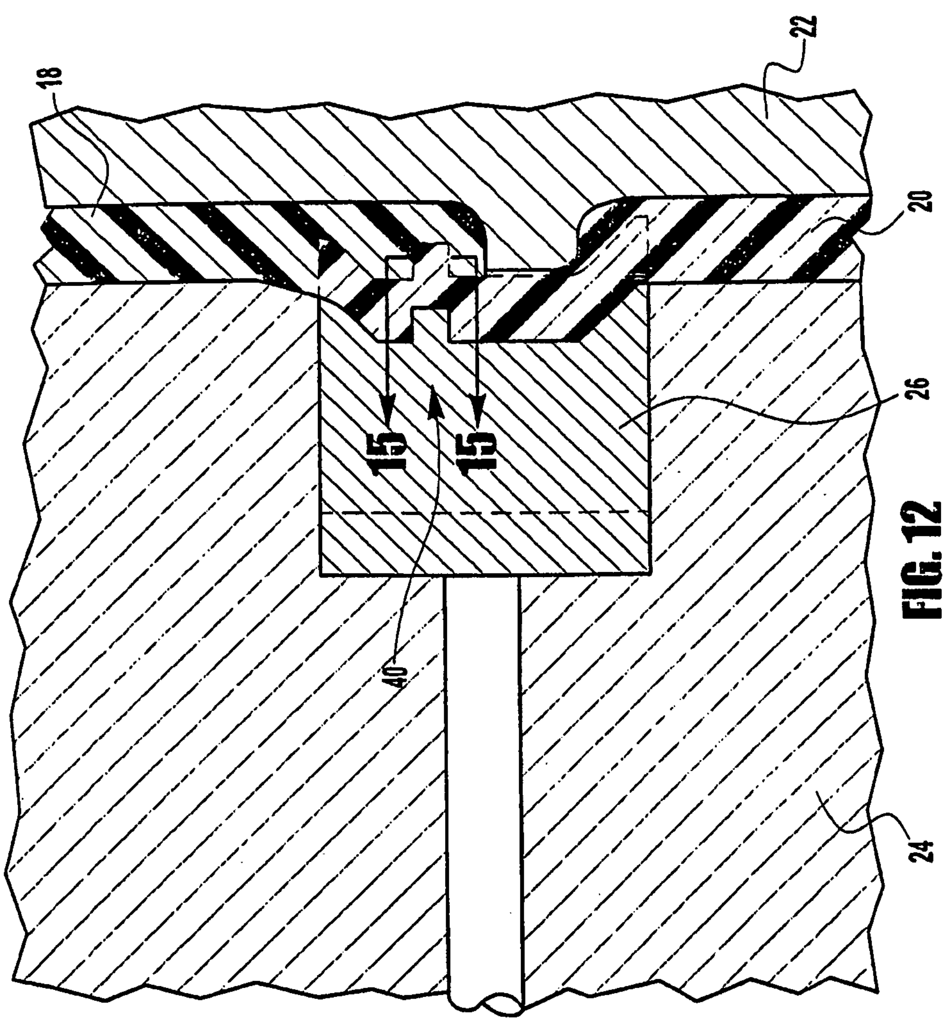
FIG. 12 is a schematic side section view of a mold with a slide member in a retracted position according to an exemplary embodiment.

Referring to FIGS. 12-14, an interlocking geometry is created to provide a mechanical lock in addition to any chemical bond (e.g., fused polymeric resin) that exists to improve the strength of the two-shot boundary. According to a preferred embodiment, the molded article includes interlocking geometries and an angled shut-off. FIG. 12 is a fragmentary side section view of the mold configured to provide a molded article with a mechanical interlock 40. The mechanical interlock 40 is provided by one or more (or a series of) projections and/or recesses on the retractor. FIG. 13 illustrates a section of a square mechanical interlock 42 wherein the projections and/or recesses on the retractor have a square cross-section. FIG. 14 illustrates a section of a dovetail mechanical interlock 44 wherein the projections and/or recesses on the retractor have angled sides (e.g., to provide additional interlock, directional stability). The first shot of resin that forms first portion 18 is, for example, a first color and the second shot of resin that forms second portion 20 is, for example, a second color. As such, the locking direction is vertical.

Figure 15:
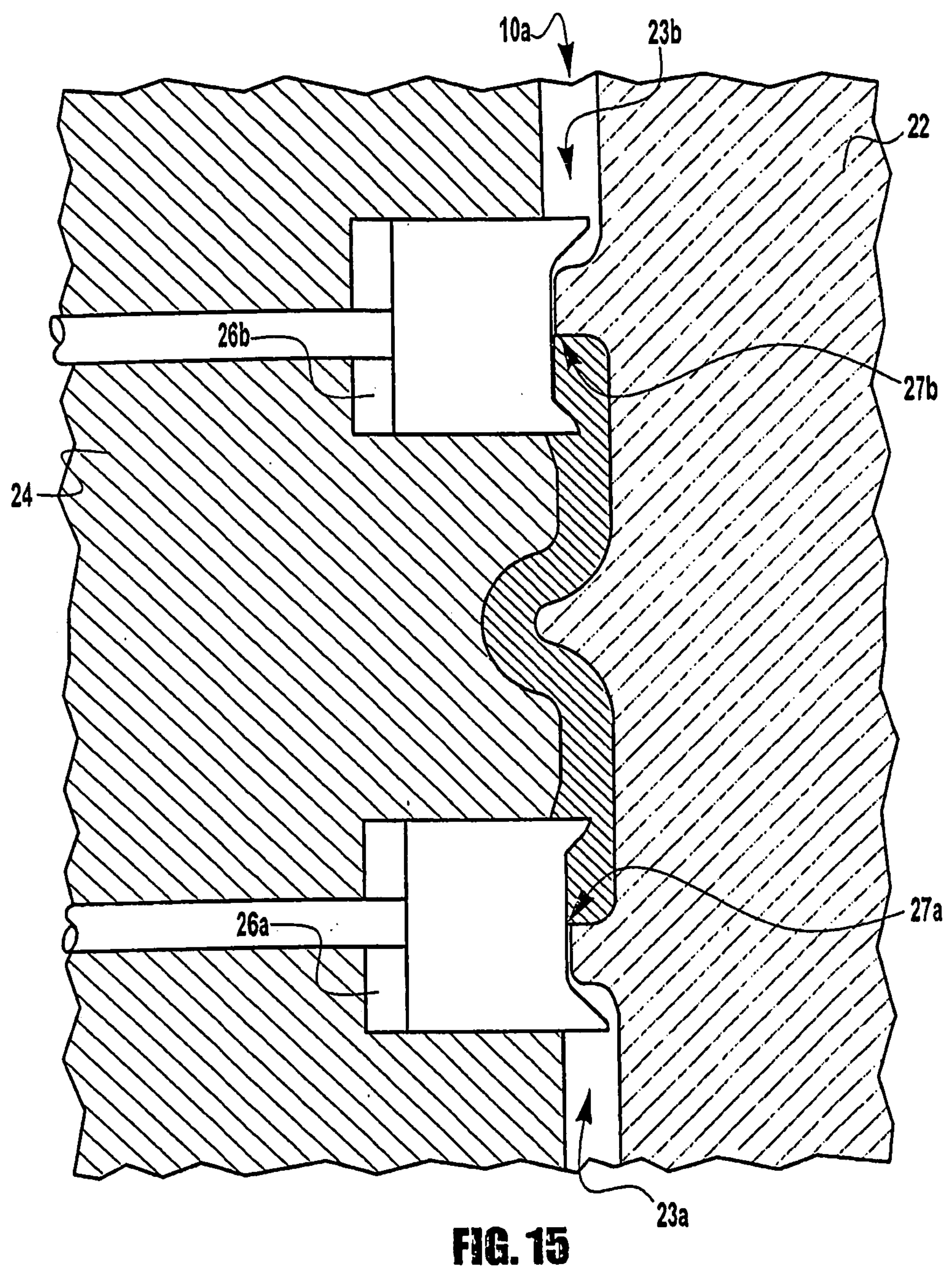
FIG. 15 is a section view of a mold configured to form an article with three resin injections using two slide members in extended positions and a first polymeric material that has been injected into a first cavity according to an alternative embodiment.
Figure 16:
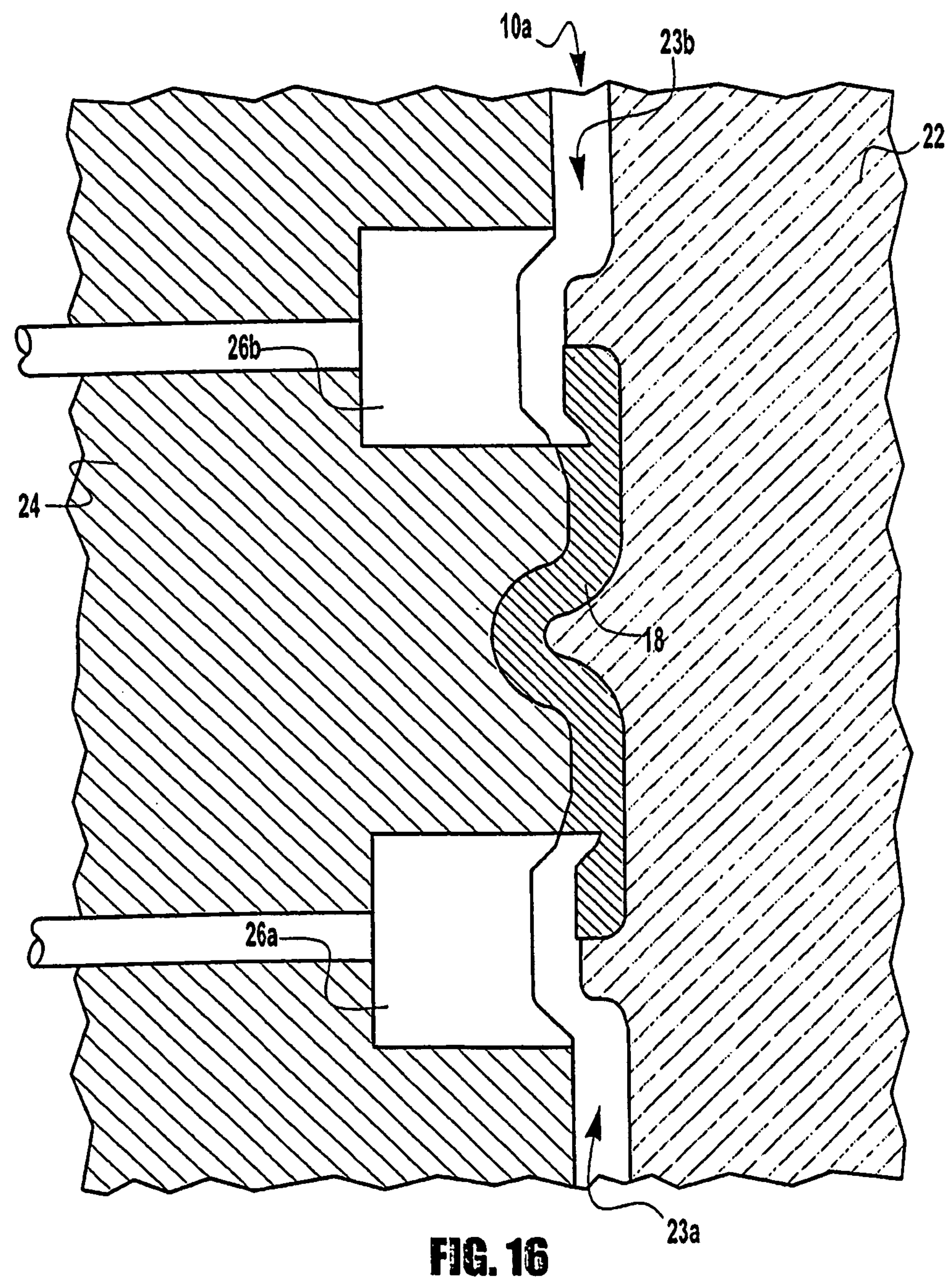
FIG. 16 is a schematic side section view of the mold of FIG. 15 with the slide members in retracted positions.
Figure 17:
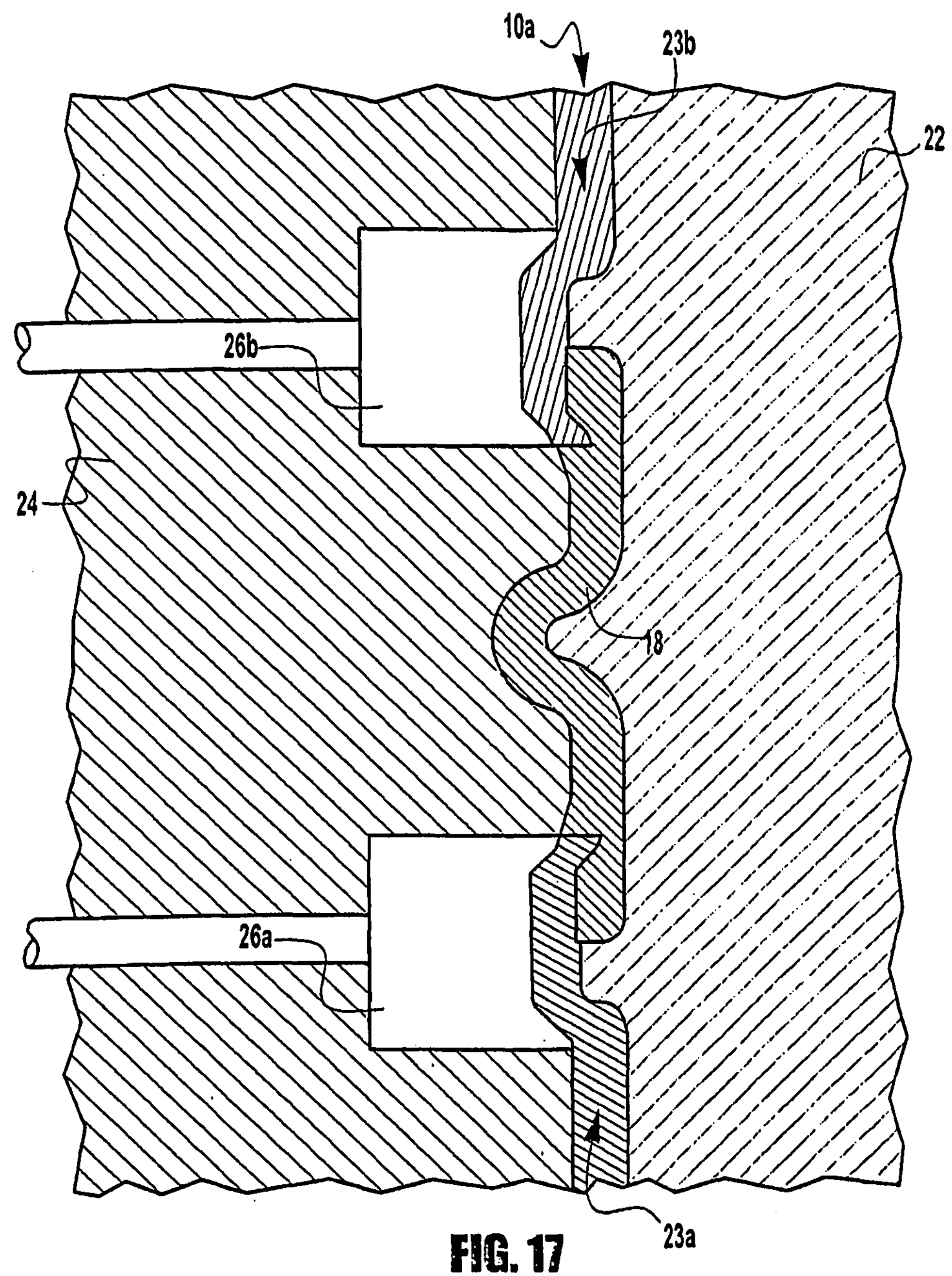
FIG. 17 is a schematic side section view of the mold of FIG. 16 with a second polymeric material injected into a second cavity and a third polymeric material injected into a third cavity.

FIGS. 15-17 show a process for molding an article (e.g., the substrate) with three resin shots. FIG. 15 is a section view of a mold configured to form an article with three materials using two slide members in extended positions and a first polymeric material injected into a first cavity according to an alternative embodiment. FIG. 16 is a schematic side section view of a mold with the slide members in retracted positions. FIG. 17 is a schematic side section view of a mold with a second polymeric material injected into a second cavity and a third polymeric material injected into a third cavity.

The method uses a multi-shot molding techniques to produce a one-piece, multi-color/multi-material trim panel 10*a* by integration of the three resin materials into a single substrate. The mold includes a cavity 22, a core 24, a first retractor 26*a,* and a second retractor 26*b*. The first shot of polymeric material (representative of a first portion 18 of trim panel 10*a*) is constrained within the mold corresponding to a particular region on trim panel 10*a* by retractors 26*a,* 26*b*. The mold shown in FIG. 15 includes a vent 27*a* between retractor 26*a* and cavity 22 and a vent 27*b* between retractor 26*b* and cavity 22. According to an alternative embodiment, the retractors may be designed to "shut-off" against the cavity (i.e., no vent).

Once the first cavity is filled with the first polymer resin, first retractor 26*a* is displaced to provide a second cavity 23*a* (defined by the displaced first retractor 26*a,* cavity 22, core 24, and first portion 18), and second retractor 26*b* is displaced (preferably by approximately the thickness of the part) to provide a third cavity 23*b* (defined by the displaced second retractor 26*b,* cavity 22, core 24, and first portion 18. The first retractor 26*a* and second retractor 26*b* are configured to move between a first position and a second position during the molding operation (i.e., the mold is reconfigurable). First retractor 26*a* and second retractor 26*b* may be configured to move at the same time or move at separate times. The polymeric resin that forms second portion 20*a* and the polymeric resin that forms third portion 20*b* may be configured to be injected at the same time or at different times. According to alternative embodiments, the retractors are configured to move to three or more positions (e.g., a third position, etc.) during the molding operation. The retractors may be moved using any number of methods, including a spring-loaded system (so that when the mold sections open, the slide moves back into one of the mold sections), hydraulics, pneumatics, mechanically, or the like.

The second shot of polymeric material that forms second portion 20*a* (representative of a second portion of trim panel 10*a*) then fills the second cavity 23*a* and polymer flows to and bonds with the first material boundary. The second shot may be provided by a secondary injection unit. According to a preferred embodiment, the first material is at least partially solidified when the second material is injected.

The third shot of polymeric material that forms third portion 20*b* of trim panel 10 then fills the third cavity 23*b* and polymer flows to and bonds with the first material boundary. The third shot may be provided by a third injection unit. According to a preferred embodiment, the first material is at least partially solidified when the third material is injected.

The process may have any of a variety of sequences. For example, the first retractor 26*a* may be moved before the second retractor 26*b* and then the polymeric material may be injected at the same time or one after the other. Alternatively, the first retractor may be moved before (or after) the second retractor and the n the polymeric material may be injected at the same time or one after the other (e.g. before, during, or after the movement of the other retractor).

FIGS. 24-31 illustrate a retractor concept for allowing vertical walls (parallel to die draw) to be full material thickness (e.g., for use in forming at corners) according to an exemplary embodiment. FIGS. 24 and 25 are a horizontal section of the mold having a core 20, a cavity 22, a first retractor 26*a,* a second retractor 66 and a secondary slide 26*b.* Secondary slide 26*b* is configured to provide molded in detail for this particular molded article (i.e., recesses to receive an end cap for an instrument panel). FIGS. 26-31 are vertical section views of the mold and the molded article (as it is molded). FIGS. 26-28 are vertical sections of the mold when the first portion (having a first color) of the molded article is injected with a first material. FIGS. 29-31 are vertical sections of the mold when the second portion (having a second color) of the molded article is injected with a second material. As shown, use of the second retractor 26*b* is used to provide additional wall thickness.

FIGS. 3, 4, and 18-21 illustrate preferred, exemplary, and alternative configurations and methods of the coupling skin to the substrate and introducing the compressible material between the skin and the substrate.

According to an exemplary embodiment, the skin is made of a relatively soft or flexible material comprising a polymeric material (e.g., polyurethane, polyvinylchloride (PVC), a thermoplastic olefin (TPO), etc.). According to other exemplary embodiments, the skin may be made of other materials, including woven or non-woven textiles such as cloth, fabric leather, composite materials, layered materials (e.g., a layer of leather applied above a polymeric material layer), etc.

According to an exemplary embodiment, the skin is manufactured or produced utilizing a slush molding process. In a slush molding process, a thermoplastic material in a liquid or powdered form is introduced into a temperature-controlled mold to form a viscous skin adjacent to the mold walls. Once the skin is formed, the excess material is removed from the mold and the skin is allowed to cure and cool, after which the skin is removed from the mold. One advantage of utilizing a slush molding process is that it is relatively inexpensive and efficient in producing relatively complex skin geometries.

According to another exemplary embodiment, the skin is manufactured or produced utilizing a vacuum forming process. In a vacuum molding process, a pre-cut or formed sheet of polymeric material is provided in a mold and heated to soften the material. A vacuum is applied to the mold, which draws the softened polymeric material toward the walls of the mold. The polymeric material then cools and maintains the shape defined by the mold walls.

According to other exemplary embodiments, the skin may be manufactured according to various other methods. For example, the skin may be formed in an injection molding process, an extrusion process, a casting process (e.g., gravity casting), or any other suitable process for forming a polymeric skin.

The skin may have a size, shape, and configuration that is adapted for features included in the substrate. According to one exemplary embodiment, a substrate may include a cutout or depression, and a skin may be provided within the cutout. According to another exemplary embodiment (shown, e.g., in FIGS. 3 and 4), a substrate 120 may be provided such that it protrudes outward, and a skin 122 may be applied over substrate 120. The size, shape, and configuration of the skin and substrate may have any number of forms, and relatively complex geometries may be formed. For example, the skin may be provided over a substrate in the form of a door panel such that the skin wraps around an edge (e.g., a rear edge) of the panel. One of skill in the art will appreciate that various possibilities exist in this regard. According to an exemplary embodiment in which the skin is made of a polymeric material and has a thickness of between approximately 0.5 and 3.0 millimeters, and particularly preferably between approximately 1.0 and 1.5 millimeters.

Figures 3, 4:
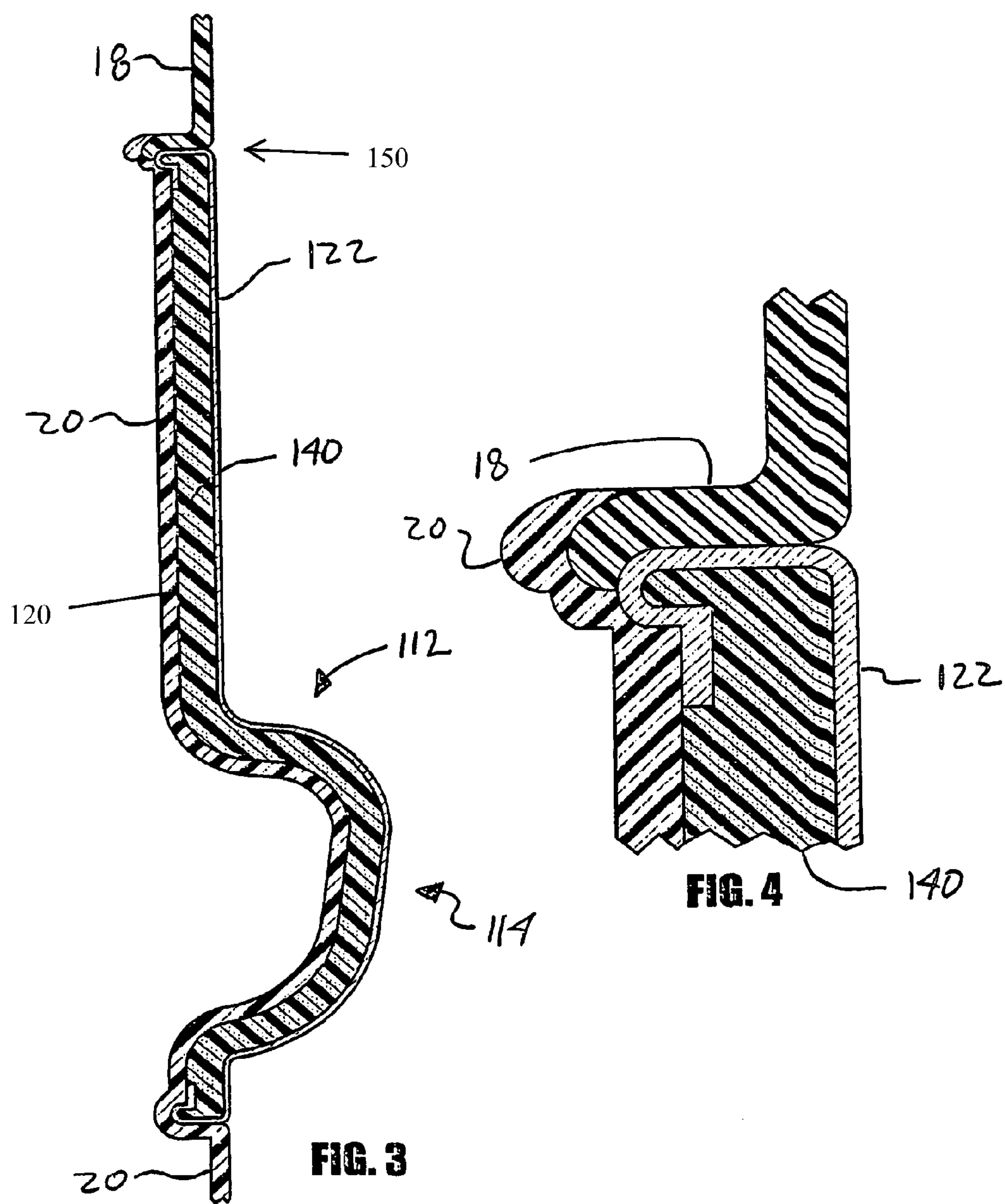
FIG. 3 is a fragmentary sectional view of the door panel illustrated in FIG. 1*b* taken along line 2-2.
FIG. 4 is a fragmentary sectional view of the door panel of FIG. 3.

As shown in FIG. 3, boundary 150 (e.g., a seam or joint) is formed or provided between skin 122 and the substrate 120, such that substrate 120 forms a frame around skin 122. The size, shape, and configuration of boundary 150 may vary in various exemplary embodiments. Boundary 150 may also be eliminated or reduced in size using a material to at least partially fill in boundary 150 (e.g., a caulk, adhesive, liquid polymer, or other materials). According to other embodiments, the skin may be provided in such a manner that no visual boundary exists (e.g., the skin is provided over all portions of the substrate such that no boundary is visible on the exterior surface of the component).

Skin 122 and/or substrate 120 may include features configured to couple at least a portion of skin to substrate 120. The coupling may be accomplished by way of a mechanical interconnection (e.g., a friction or interference fit) or by other mechanisms. According to an exemplary embodiment, the skin is coupled to the substrate in a manner that provides a relatively airtight and/or watertight seal between the skin and the substrate.

According to a preferred embodiment, skin 122 is provided on substrate 120 in such a manner that a space or void (e.g., a cavity or gap) (see, e.g., space) is formed intermediate or between at least a portion of skin 122 and substrate 120. According to one exemplary embodiment, substantially all of skin 122 away from boundary 150 between substrate 120 and skin 122 is separated from substrate 120 by a space or void (e.g., to form a cavity). According to another exemplary embodiment, portions of the skin may be provided in direct contact with the substrate, such that one or more spaces or voids are provided between the skin and the substrate in one or more particular regions. The particular design chosen may depend on any of a variety of factors, including the desired look and feel of the outer surface of the panel, materials costs, ease of manufacturing, etc.

Figure 19:
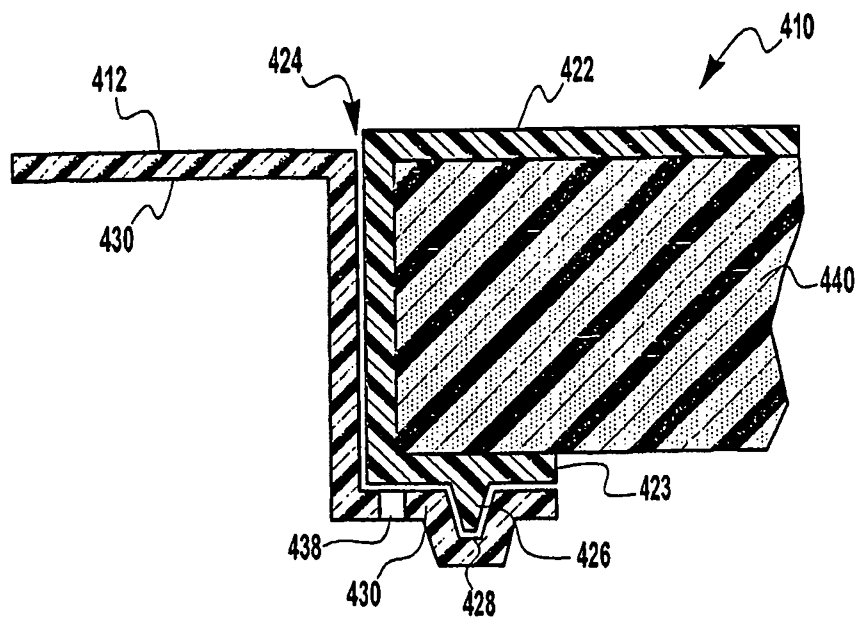
FIG. 19 is a sectional view of a portion of a component with engaged features according to another exemplary embodiment.

A material (e.g., compressible or filler material 140) shown in FIG. 19 is provided or introduced into the cavity between substrate 120 and skin 122 to act as a filler. It is intended that such material acts as a relatively soft or cushioning material to provide cushioned region 112 with at least a portion of its relatively soft or cushioned characteristic. According to an exemplary embodiment, the filler material is a polymeric material such as a foam material (e.g., a urethane foam). The filler material is provided into the cavity in liquid form and is subsequently expanded to fill the cavity. For example, where a foam material is provided as a filler material, the foam reacts to expand and form a cellular structure within the cavity.

According to an exemplary embodiment, a method of producing a component having one or more cushioned regions includes inserting or providing a substrate or a portion thereof in a mold or other tooling such as a foam-in-place (FIP) tool having a clamshell configuration. One preferred tool is a composite/aluminum tool manufactured by EPW, Inc. of Elkhart, Ind. The substrate is provided in the mold such that the "A" side or exterior surface portion faces outward (i.e., the rear portion of the substrate is in contact with the mold walls).

The skin (e.g., a slush molded or vacuum molded polymeric skin) is coupled to the substrate in one or more locations via mechanical and/or vacuum means. For example, the skin may be coupled to the substrate by inserting protrusions formed on the skin into openings such as channels or grooves formed in the substrate to mechanically couple the skin to the substrate. According to various embodiments, a vacuum may be drawn to secure the skin to the substrate in addition to or in place of the mechanical coupling (e.g., utilizing one or more vacuum apertures formed in the substrate).

Once the skin is secured to the substrate, the mold or tooling is closed. Foam or another soft or cushioning filler material is introduced in one or more cavities formed between or intermediate the skin and the substrate. One or more fill tubes or other devices are coupled to an aperture formed in the substrate that provides an entry point into the one or more cavities provided between the skin and substrate. One or more vent holes may also be provided in the substrate to reduce the amount of carbon dioxide or other gas accumulating within the component during the filling operation.

The component comprising the skin, substrate, and foam is then removed from the mold or tooling. The skin is coupled to the substrate both by mechanical means (e.g., protrusion and opening coupling) and by the interaction and/or bonding between the filler material and the skin and substrate. For example, a bond may be formed between the skin and foam provided in a cavity. According to an alternative embodiment, an adhesive may be provided on one or both of the substrate and the skin on the interior of the cavity to bond the foam thereto.

Figure 20:
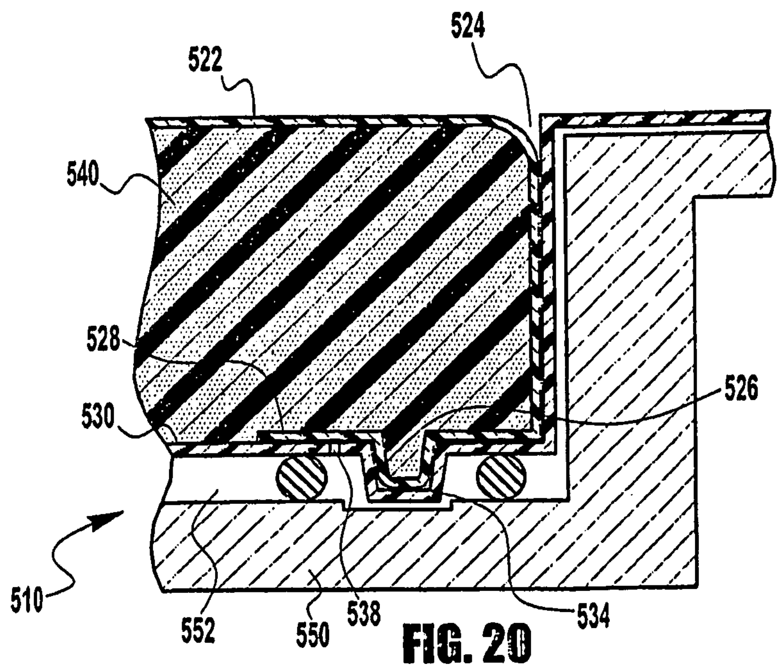
FIG. 20 is a sectional view of a component with engaged features according to another exemplary embodiment illustrating a component formation operation.
Figure 21:
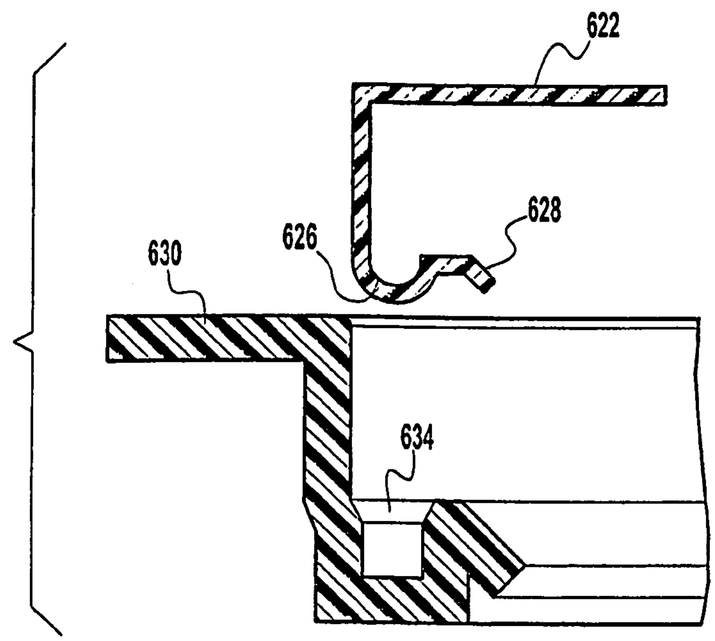
FIG. 21 is an exploded sectional view of a skin and a substrate for a component according to another exemplary embodiment.
Figure 22:
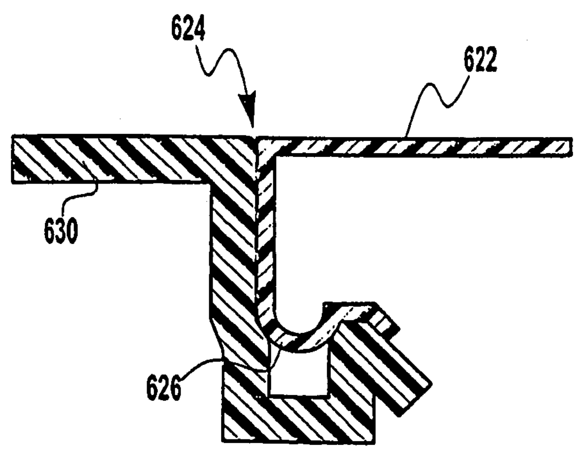
FIG. 22 is a sectional view of the skin and substrate shown in FIG. 21 coupled together.

FIGS. 18-22 show various embodiments for forming of the door panel. For example, FIGS. 19 and 20 illustrate one exemplary embodiment showing the coupling between skin 322 and substrate 330 (FIG. 20 shows an enlarged portion of FIG. 19 showing the point of coupling in greater detail). A protrusion or extension 326 (shown, for example, as a generally U-shaped portion of the skin) extends from the skin into an opening or channel 334 (e.g., a groove, recess, notch, etc.) provided or formed in substrate 330. The size, shape, and configuration of protrusion 326 and channel 334 may be provided such that protrusion 326 and channel 334 mate when they are brought together (e.g., the protrusion may include a relatively rounded or curved portion that has a radius similar to a radius provided for a relatively rounded or curved portion of the channel or opening, as shown in FIGS. 24-25, which show a substrate 630 having a channel 634 provided therein and a skin 622 having a rounded protrusion 626 and a flange or extension 628; as shown in FIG. 25, skin 622 is coupled to substrate 630 and a boundary 624 is formed therebetween, and protrusion 626 is received within aperture 634). Protrusion 326 may include a flange or extension 228 that extends therefrom to provide enhanced fitment between skin 322 and substrate 330.

Any of a variety of configurations may be utilized for the protrusion and channel, several nonexclusive examples of which are shown in the accompanying FIGURES. The protrusion may be formed on the skin by forming a portion of the skin in the mold (e.g., to provide an edge of the skin with a "folded back" configuration to form a protrusion) or by forming the protrusion after the skin is removed from the mold. The protrusion may be integral to the skin or may be produced separately and secured thereto by an adhesive or other fastener. The position of the protrusion and the channel may be reversed, such that a channel is formed in at least a portion of the skin and one or more protrusions are formed in the substrate, such that the protrusion(s) of the substrate may be inserted into the channel(s) formed in the skin to produce a mechanical seal between the skin and substrate.

One or both of protrusion 126 and the walls or surfaces of channel 128 may be relatively flexible and/or resilient such that insertion of protrusion 126 into channel 128 causes one or both of protrusion 126 and the walls or surface of 132 to bend or flex. Upon insertion of protrusion 126 into channel 128, the flexible and/or resilient component may return to its pre-insertion state to couple skin 122 to substrate 120.

According to an exemplary embodiment, skin 122 and substrate 120 are coupled together such that a relatively airtight and/or watertight seal is provided. In one example, skin 122 includes a protrusion that extends substantially entirely about the periphery of skin 122 and substrate 120 includes channel 128 that extends substantially entirely about the periphery of the area over which skin 122 is provided. Protrusion 126 is pressed or positioned into channel 128 to form a seal about substantially the entire periphery of skin 122 to form a seal. According to an exemplary embodiment, one or both of protrusion 126 and channel 128 may extend only partially about their periphery to provide local sealing of skin 122 to substrate 120 (e.g., the skin may include a plurality of protrusions that are provided intermittently about the periphery of the skin). Various sizes, shapes, and configurations may be used for the protrusion and the channel to couple the skin to the substrate.

According to another exemplary embodiment, the skin includes one or more features (e.g., protrusions) that are drawn into an opening such as a groove, channel, or other structure provided in the substrate by way of a vacuum or other pressure or force. For example, the skin may include one or more protrusions that extend at least a portion of the way about the periphery of the skin, and the protrusions may be inserted into an opening provided in the substrate. In such an embodiment, the skin is held in place by application of a vacuum that removes the air between the protrusions and the walls of the opening. In this manner, a relatively airtight and/or watertight seal may be formed between the skin and the substrate.

Figure 18:
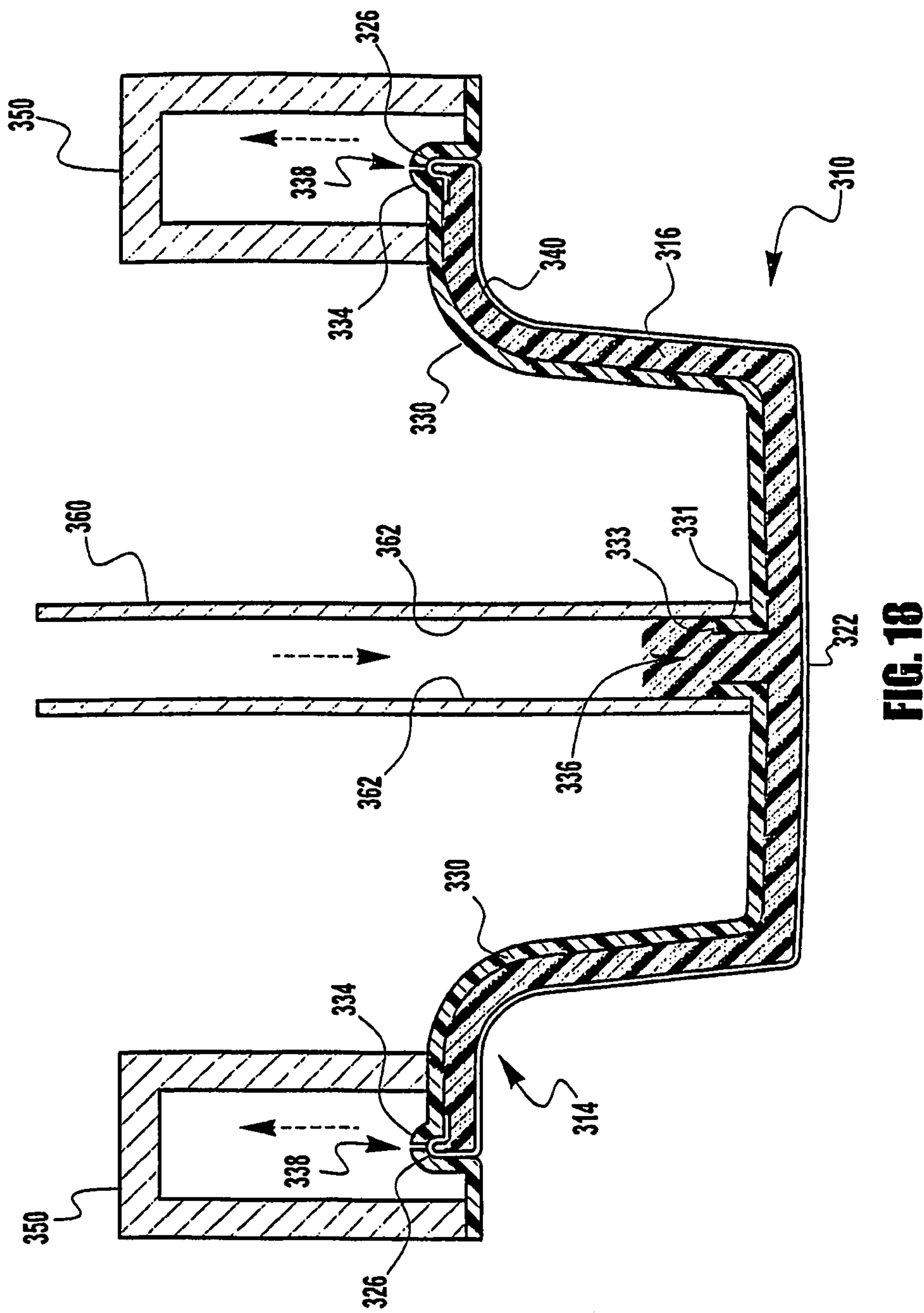
FIG. 18 is a sectional view of a component similar to that shown in FIG. 3 illustrating a component formation operation.

FIG. 18 is a schematic view of an exemplary embodiment of a component 310 in which an aperture 336 is formed or provided in a substrate 330; a vacuum may be drawn through one or more apertures 338 formed in a channel 334 formed in substrate 330 to secure a skin to substrate 330. A vacuum box 350 may be used to draw the vacuum, and may have a size sufficient to allow for overflow of filler material 340 into vacuum box 350 during manufacturing.

In contrast to the embodiment shown in FIG. 18, one or more apertures provided in the substrate for allowing the use of a vacuum may be provided in other locations in the substrate (i.e., instead of directly proximate or adjacent to a protrusion provided on the skin). For example, FIG. 19 illustrates an exemplary embodiment of a component 410 having a skin 422 and a substrate 430 with a boundary 424 provided therebetween in which an aperture 438 is provided adjacent or proximate to boundary 424 between skin 422 and substrate 430. In such an embodiment, a locator or push button 423 is provided to provide a place for an individual to press a protrusion 426 into a channel 428. A filler material 440 is provided between skin 422 and substrate 430.

According to another exemplary embodiment of a component 510 shown in FIG. 20, a protrusion 526 of a skin 522 is provided in a channel 534 of a substrate 530, and an aperture 538 is formed in substrate 530 underlying a flange 528 provided in skin 522. That is, aperture 538 is provided such that it is on the side of protrusion 526 opposite a boundary 524 formed between skin 522 and substrate 530. A vacuum box 550 forms a vacuum chamber 552 adjacent aperture 538, and a filler material 540 is provided between skin 522 and substrate 530.

According to yet another exemplary embodiment, both mechanical fastening features (e.g., interference fit protrusion(s) and channel(s)) and vacuum coupling features may be provided. According to such an embodiment, the skin includes one or more protrusions that fit into one or more openings to mechanically secure the skin to the substrate, and the substrate also includes one or more apertures to allow suction by a vacuum to secure the skin to the substrate. In any of the exemplary embodiments illustrated in the FIGURES (or in other exemplary embodiments), the protrusion may provide a mechanical coupling in addition to the seal provided by the use of a vacuum or may act only as a guide to provide proper location of the skin onto the substrate.

FIG. 18 illustrates an exemplary embodiment of a mechanism for introducing material into the space or cavity 316 formed between skin 322 and substrate 330. According to this embodiment, two apertures 338 are provided in substrate 330 for allowing vacuum suction. A vacuum is created to secure skin 322 to substrate 330 (e.g., by utilizing vacuum boxes 350 to draw the vacuum and secure skin 322 to substrate 330 in the areas of apertures 338). Mechanical coupling between protrusions 326 and channels 334 may also be utilized to secure skin 322 to substrate 330.

Once skin 322 is secured to substrate 330 by vacuum and/or mechanical means, foam or other filler material 340 is introduced into cavity 316 through a fill tube or nozzle 360 (e.g., by injection or gravity pouring). Fill tube 360 is coupled to an opening or aperture 336 formed in a portion of substrate 330 to allow introduction of the filler material 340 into cavity 316. Because skin 322 is coupled to substrate 330 in a relatively airtight and/or watertight manner (e.g., by way of the vacuum and/or mechanical coupling mechanisms), filler material 340 does not escape into vacuum box 350 through apertures 338. While the embodiment shown in FIG. 18 illustrates a fill tube 360 that has an interior surface 362 that engages an exterior surface 331 of walls 333 of aperture 336 provided in substrate 330, such an arrangement may be reversed such that a portion of fill tube 360 is inserted into an opening or aperture in substrate 330. Various other configurations for the engagement between substrate 330 and fill tube 360 may also be utilized according to various other exemplary embodiments.

The numbers, size, shape, and configuration of apertures for allowing vacuum suction and for coupling to the fill tube may vary according to other exemplary embodiments. For example, more than one fill tube may be coupled to the substrate in various locations, and more than one aperture may be provided for coupling to such fill tubes. The various features of the apertures may be optimized according to various considerations, including manufacturability, cost, and other considerations.

According to an exemplary embodiment, the skin is coupled to the substrate in a manner that does not require the use of a vacuum (e.g., a mechanical interlock or coupling between a portion of the skin and a portion of the substrate). In such an embodiment, the vacuum boxes (FIG. 18) may be omitted, with the mechanical coupling providing an airtight and/or watertight seal between the skin and the substrate. The mechanical coupling is intended to couple the skin to the substrate in a manner that does not allow foam or other filler material to escape.

Figure 23:
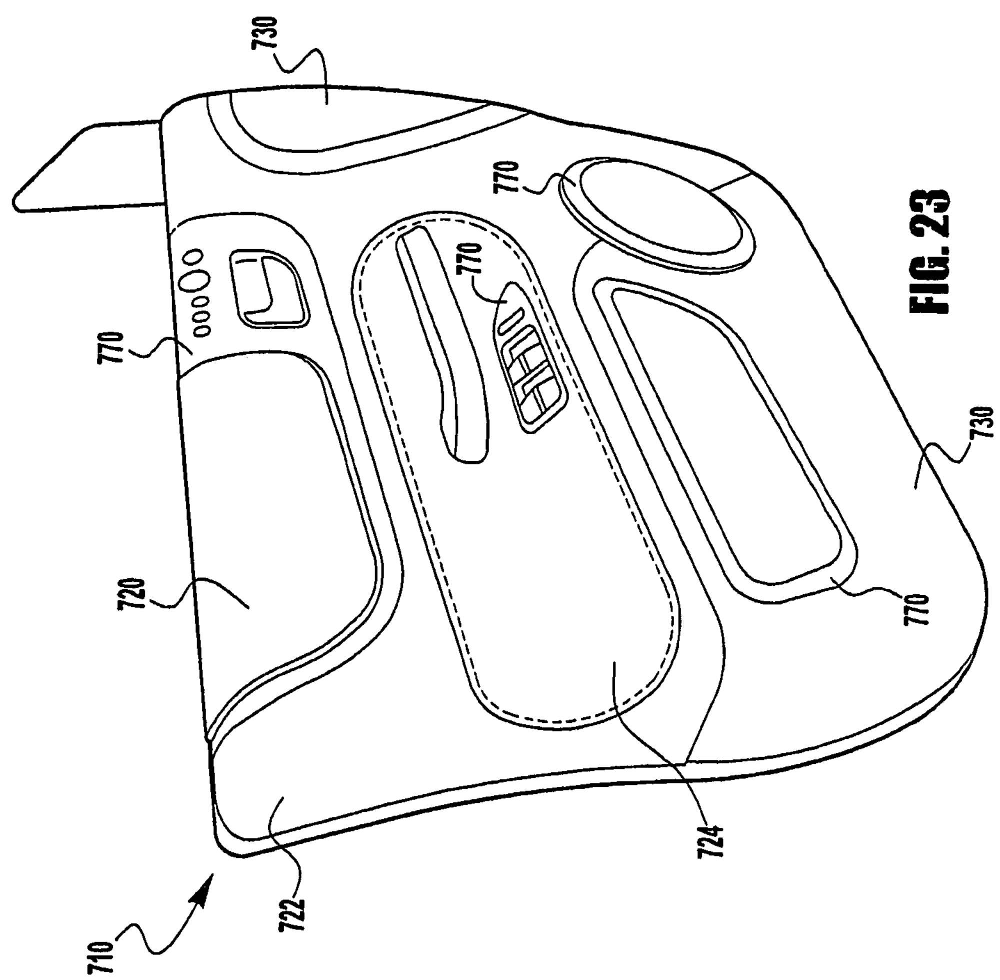
FIG. 23 is a perspective view of a door panel having areas of cushioning according to an exemplary embodiment.

The various teachings of the present disclosure may be used to form components having a wide variety of geometries and complexity. FIG. 23 shows one exemplary embodiment of a component 710 in the form of a door panel for a vehicle. Component 710 includes a substrate 730 made of a relatively rigid material such as hard plastic or the like and a number of members or elements that are characterized as regions of localized cushioning or softness (e.g., labeled with reference numerals 720, 722, and 724). Trim material (e.g., plastic, wood, metal, etc.) may also be provided in various locations on component 710.

Members 720, 722 and 724 may be made at the same time or in a sequential manufacturing method, and may be made from the same or different materials (e.g., member 720 may have a different skin and/or filler material than is used for members 722 and 724; for example, the skin color of member 720 may differ for aesthetic reasons and/or member 720 may utilize different materials because member 720 is likely to receive a great deal of driver or passenger contact (e.g., the driver or passenger may rest an elbow or arm on member 720)).

Various process steps may also be utilized in addition to or in place of those described above. For example, it may be necessary to seal or close one or more apertures provided in the substrate subsequent to the filling operation (e.g., to prevent foam or filler material from escaping). In another example, the mold may be rotated after inserting the skin and substrate into the mold and closing the mold prior to filling the cavity or cavities with filler material.

It should be noted that according to various exemplary embodiments, all or a part of the substrate may have a cushioned or padded portion provided adjacent thereto. For example, according to an exemplary embodiment, a skin is applied adjacent a substrate, and portions of the skin may be in direct contact with the substrate, while other portions of the skin may be separated from the substrate by a filler material. In this manner, localized regions of cushioning may be provided while retaining the look and feel of the skin even in those regions not provided with cushioning.

It is also important to note that the construction and arrangement of the elements of the vehicle trim panel as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, the substrate may be molded from two or more resin injections (e.g., multiple colors or material types). Further, the molded articles or components may be provided in a wide variety of sizes, shapes, and configurations according to the various exemplary embodiments. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A trim component for a vehicle comprising:

a one-piece molded substrate having a first portion formed of a first resin, a second portion formed of a second resin and a channel, the second resin being different than the first resin;

a skin having a protrusion and coupled to the substrate by engagement of the protrusion with the channel;

a foam material disposed between the skin and the substrate;

wherein the skin and the foam material form a cushioned region for the vehicle component.

2. The trim component of claim 1 wherein the skin is coupled to the substrate by a friction or interference fit between the protrusion and the channel.

3. The trim component of claim 1 wherein the protrusion is formed as at least one of a “U”-shaped portion of the skin and a solid portion extending from the skin.

4. The trim component of claim 1 wherein the substrate includes at least one vacuum aperture that extends through the substrate and is used to draw a vacuum through the substrate to couple the skin to the substrate when the foam material is injected into a space between the skin and the substrate.

5. The trim component of claim 4 wherein the vacuum aperture is located in the channel.

6. The trim component of claim 2, wherein the skin is coupled to the substrate to form an airtight seal between the skin and substrate.

7. The trim component of claim 1, wherein a first section of the channel is defined by the first portion of the substrate and a second section of the channel is defined by the second portion of the substrate.

8. The trim component of claim 1, wherein the skin also includes an exterior surface that forms a boundary with an exterior surface of one of the first portion and the second portion.

9. A trim component for a vehicle comprising:

a substrate having a first portion formed of a first resin, a second portion formed of a second resin, and a channel that is partially defined by the first portion and partially defined by the second portion;

a skin having an exterior surface and a protrusion that includes a first side and a second side, the first side configured to engage the channel to couple the skin to the substrate, the second side defining a recess; and a foam material provided in the recess between the second side and exterior surface of the skin;

wherein the first resin is different than the second resin.

10. The trim component of claim 9, wherein the first portion includes an exterior surface that defines a boundary with the skin.

11. The trim component of claim 10, wherein the substrate forms a frame around the skin.

12. The trim component of claim 10, wherein the skin is coupled to the substrate by a friction or interference fit between the protrusion and the channel.

13. The trim component of claim 12, wherein the skin is coupled to the substrate to form an airtight seal between the skin and substrate.

14. The trim component of claim 9, wherein the protrusion includes a generally J-shaped portion that extends from the exterior surface of the skin.

15. The trim component of claim 14, wherein the protrusion further includes an arm that extends from the J-shaped portion away from the recess, such that the arm is configured to contact a portion of the substrate that is adjacent to the channel.

16. The trim component of claim 9, wherein the substrate includes at least one vacuum aperture that extends through the substrate and is used to draw a vacuum through the substrate to couple the skin to the substrate when the foam material is injected into a space between the skin and the substrate.

17. The trim component of claim 16, wherein the vacuum aperture is located in the channel.

18. A trim component for a vehicle comprising:

a substrate having a first portion formed of a first resin, a second portion formed of the first resin, and a third portion formed of a second resin and provided between the first and section portions, the first and third portions defining a first channel, the second and third portions defining a second channel;

a skin having a first protrusion configured to engage the first channel and a second protrusion configured to engage the second channel; and a foam material provided between the skin and at least the third portion of the substrate.

19. The trim component of claim 18, wherein each protrusion forms a recess on the side opposite the substrate, and wherein the recess is configured to receive the foam material.

20. The trim component of claim 18, wherein the substrate includes at least one vacuum aperture that extends through the substrate and is used to draw a vacuum through the substrate to couple the skin to the substrate when the foam material is injected into a space between the skin and the substrate.

* * * * *